US012422126B2

(12) United States Patent
De Bevilacqua et al.

(10) Patent No.: US 12,422,126 B2
(45) Date of Patent: Sep. 23, 2025

(54) LED LIGHTING DEVICE WITH HONEYCOMB GRID

(71) Applicant: ARTEMIDE S.P.A., Milan (IT)

(72) Inventors: Carlotta Francesca Isolina Maria De Bevilacqua, Milan (IT); Laura Pessoni, Milan (IT); Roberto Franzosi, Milan (IT)

(73) Assignee: ARTEMIDE S.P.A. (IT)

( * ) Notice: Subject to any disclaimer, the term of this patent is extended or adjusted under 35 U.S.C. 154(b) by 0 days.

(21) Appl. No.: 18/633,743

(22) Filed: Apr. 12, 2024

(65) Prior Publication Data

US 2025/0043938 A1 Feb. 6, 2025

(30) Foreign Application Priority Data

Apr. 14, 2023 (IT) ........................ 102023000007221

(51) Int. Cl.
*F21V 11/06* (2006.01)
*F21S 8/04* (2006.01)
(Continued)

(52) U.S. Cl.
CPC ................. *F21V 11/06* (2013.01); *F21S 8/04* (2013.01); *F21V 5/007* (2013.01); *F21V 5/04* (2013.01);
(Continued)

(58) Field of Classification Search
CPC . F21V 5/007; F21V 5/04; F21V 13/04; F21V 11/06; F21S 8/04
See application file for complete search history.

(56) References Cited

U.S. PATENT DOCUMENTS

2012/0212960 A1* 8/2012 Rodriguez .............. F21V 29/67 362/249.02
2015/0003059 A1* 1/2015 Haitz ................. G02B 19/0066 362/235
(Continued)

FOREIGN PATENT DOCUMENTS

CN 213065817 U * 4/2021
DE 102012203941 A1 9/2013
(Continued)

OTHER PUBLICATIONS

Li et al., LED down lamp with novel honeycomb structure, 2021, CN213065817U, https://worldwide.espacenet.com/patent/search/family/075562131/publication/CN213065817U?q=pn%3DCN213065817U (Year: 2021).*
(Continued)

*Primary Examiner* — Tracie Y Green
*Assistant Examiner* — Michael Chiang
(74) *Attorney, Agent, or Firm* — The Belles Group, P.C.

(57) ABSTRACT

An LED lighting device, extending along a longitudinal axis and having a circular shape about the axis, comprises an LED holder plate, having a front face which supports a plurality of LEDs; an optical element positioned in front of the front face of the LED holder plate and having a plurality of lenses aligned with and facing respective LEDs; and a grid positioned in front of the optical element on the opposite side of the LED holder plate and having a plurality of hexagonal cells which are arranged in a honeycomb pattern and which are aligned with and facing respective lenses of the optical element.

14 Claims, 4 Drawing Sheets

(51) Int. Cl.

| | |
|---|---|
| ***F21V 5/00*** | (2018.01) |
| ***F21V 5/04*** | (2006.01) |
| *F21Y 105/10* | (2016.01) |
| *F21Y 115/10* | (2016.01) |

(52) U.S. Cl.

CPC ....... *F21Y 2105/10* (2016.08); *F21Y 2115/10* (2016.08)

(56) References Cited

U.S. PATENT DOCUMENTS

| | | | | |
|---|---|---|---|---|
| 2018/0283656 | A1* | 10/2018 | Gommans | F21V 11/06 |
| 2019/0339537 | A1 | 11/2019 | Jiang | |
| 2022/0282851 | A1* | 9/2022 | De Bevilacqua | H10H 20/855 |
| 2023/0003364 | A1 | 1/2023 | Xue et al. | |
| 2023/0288043 | A1* | 9/2023 | Peard | F21V 5/007 |

FOREIGN PATENT DOCUMENTS

| | | | | |
|---|---|---|---|---|
| DE | 102012203941 | B4 * | 10/2014 | F21V 13/04 |
| EP | 3564578 | A1 | 11/2019 | |
| EP | 4057364 | A1 | 9/2022 | |

OTHER PUBLICATIONS

Search Report issued in Italian Application No. 102023000007221.

* cited by examiner

LED LIGHTING DEVICE WITH HONEYCOMB GRID

CROSS-REFERENCE TO RELATED APPLICATIONS

This patent application claims priority from Italian patent application no. 102023000007221 filed on Apr. 14, 2023, the entire disclosure of which is incorporated herein by reference.

TECHNICAL SECTOR

This invention relates to an LED lighting device.

The lighting device of the invention is particularly well suited to being built in, for example in a ceiling or false ceiling, although it may have various other applications.

BACKGROUND

Lighting devices, in particular those intended to light a room from above, for example built in a ceiling/false ceiling or hanging from it, also to meet increasingly stringent requirements set forth by regulations, must be not only highly efficient, but also able to operate with strong visual comfort.

In general, the lighting devices of this type comprise multiple LEDs combined with corresponding optical elements, typically lenses, and a glare reduction screen, typically shaped like a grid and positioned in front of the optical elements.

In order to meet the legal requirements in terms of glare and other specifications, the lighting devices may be penalized in terms of optical performance, and/or are relatively complex and/or bulky.

On the other hand, built-in installation requires that the lighting device is inserted in a special opening formed, for example, in a ceiling or false ceiling, and must, therefore, adapt to this opening. But shape and size of the typical openings may entail limitations to the number and/or type of LEDs that can be used and the optical elements associated with them, reducing the overall performance of the lighting device.

SUMMARY OF THE INVENTION

One purpose of this invention is, therefore, to provide an LED lighting device that makes it possible to overcome the drawbacks highlighted here in the prior art.

In particular, one purpose of the invention is to provide an LED lighting device that is extremely compact, simple, and highly efficient, able to emit light with a high degree of visual comfort and, at the same time, with high optical performance, including if built into openings formed, for example, in a ceiling or false ceiling.

This invention relates, therefore, to an LED lighting device as defined in the attached Claim 1.

Additional preferred features of the invention are defined in the dependent claims.

The LED lighting device of the invention is extremely compact, simple, and highly efficient, and emits light with high visual comfort and, at the same time, with high optical performance.

In particular, the lighting device of the invention makes it possible to use multiple LEDs, each associated with a lens and a glare reduction screen, in a high number in relation to the overall size of the lighting device and distributed across a wide surface functional to optical performance, including in circular configurations for use, for example, in a typical circular opening formed in a ceiling or false ceiling.

In substance, according to the invention, the LEDs are associated with a grid with hexagonal cells arranged in a honeycomb pattern; in this way, the number of light points and the surface functional to optical performance are maximised.

In addition, the arrangement of the LEDs makes it possible to avoid, despite the use of multiple light sources, the occurrence of the so-called multi-shadow effect, at least in typical use conditions. This is thanks to the extremely limited pitch between LED and LED, made possible, in turn, by the particular configuration of the optical element and the grid.

BRIEF DESCRIPTION OF THE DRAWINGS

Additional features and advantages of this invention will be clear from the description that follows of a non-limiting embodiment, with reference to the attached figures, in which.

DESCRIPTION OF EMBODIMENTS

Figure 1:
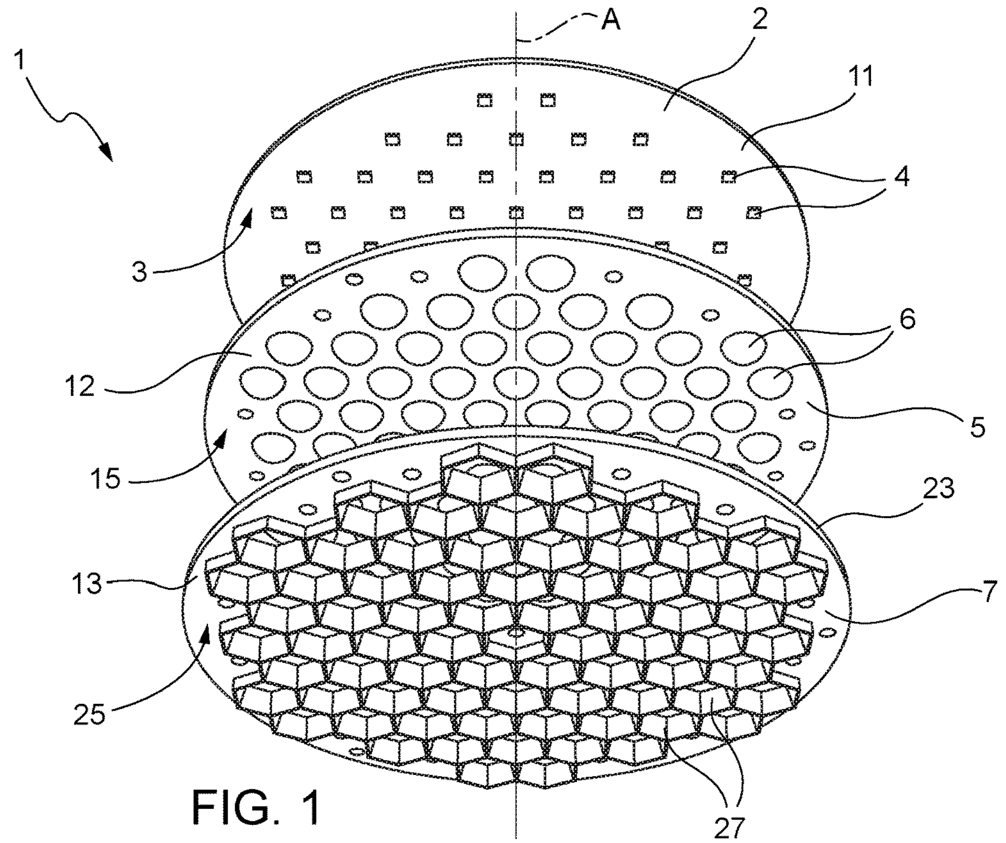
FIG. 1 is an exploded, front, schematic perspective view of an LED lighting device in accordance with the invention.
Figure 2:
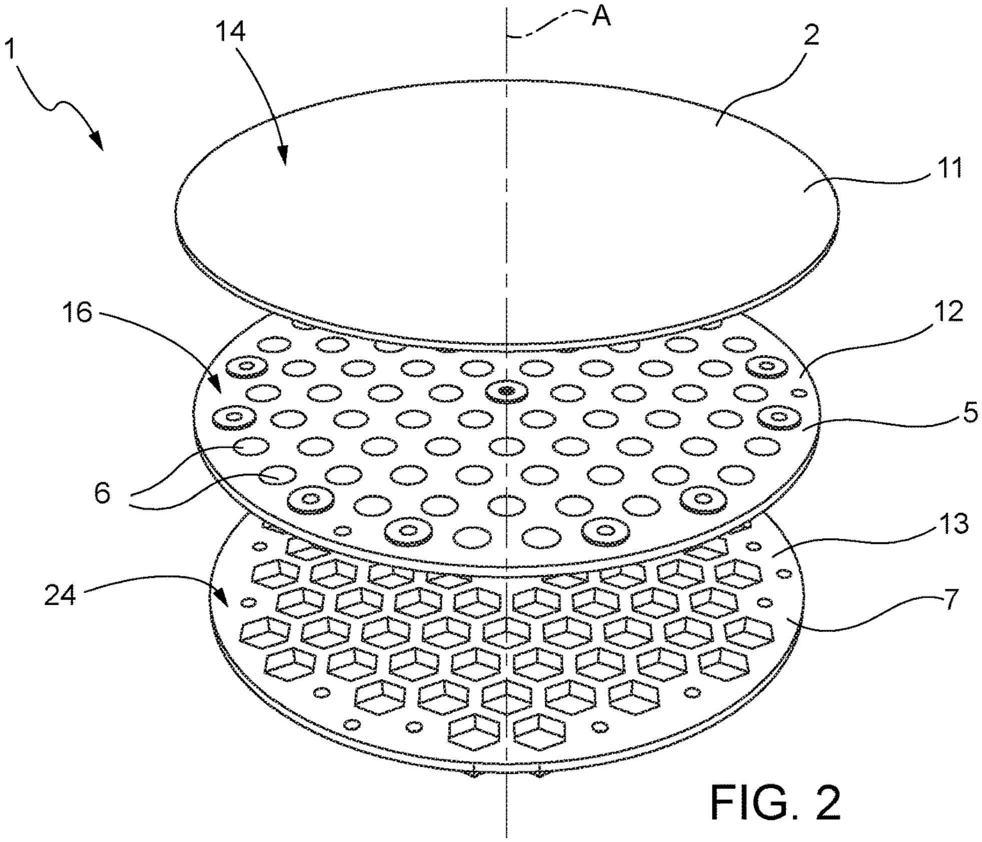
FIG. 2 is an exploded, rear, schematic perspective view of the lighting device in FIG. 1.

In FIGS. 1 and 2, the reference number 1 indicates, as a whole, an LED lighting device for lighting environments.

The lighting device 1 extends along and around a central longitudinal axis A and has a circular shape around the axis A.

The lighting device 1 comprises an LED holder plate 2, having a front face 3 that supports multiple LEDs 4 connected by a circuit (not illustrated for simplicity); an optical element 5 positioned in front of the front face 3 of the LED holder plate 2 and having multiple lenses 6 aligned and facing respective LEDs 4; and a grid 7 positioned in front of the optical element 5 on the opposite side to the LED holder plate 2 and defining a glare reduction screen.

The lighting device 1 may optionally comprise a support structure, which is not illustrated, which supports the LED holder plate 2, the optical element 5, and the grid 7, and that can assume various shapes, including depending on the intended use of the lighting device 1.

The LED holder plate 2, the optical element 5, and the grid 7 may be fixed to each other and/or to the support structure using special fasteners (known and not illustrated for simplicity).

The LED holder plate 2, the optical element 5, and the grid 7 comprise respective circular disc-shaped bodies 11, 12, 13 aligned to one another along the axis A.

For example (but not necessarily), the bodies 11, 12, 13 have basically the same diameter as each other.

In the non-limiting example illustrated, the body 11 of the LED holder plate 2 is a flat body having two opposite faces that are flat and parallel, i.e. the front face 3 and a rear face 14, opposite the front face 3.

The LEDs 4 are arranged on the front face 3 according to a hexagonal pattern, i.e. they are positioned at the centre of respective cells of a honeycomb pattern, as will be clarified below. The LEDs 4 are organised in parallel rows, with adjacent rows that are offset from each other.

The optical element 5 is positioned in front of the front face 3 of the LED holder plate 2. The body 12 of the optical element 5 is, advantageously, a monolithic body made of transparent material and the lenses 6 are defined by respective portions of the body 12.

The body 12 of the optical element 5 has two opposite faces that are flat and parallel, i.e. a front face 15 and a rear face 16, opposite the front face 15. The rear face 16 faces the front face 3 of the LED holder plate 2; the front face 15 of the optical element 4 is turned towards the grid 7.

Figure 3:
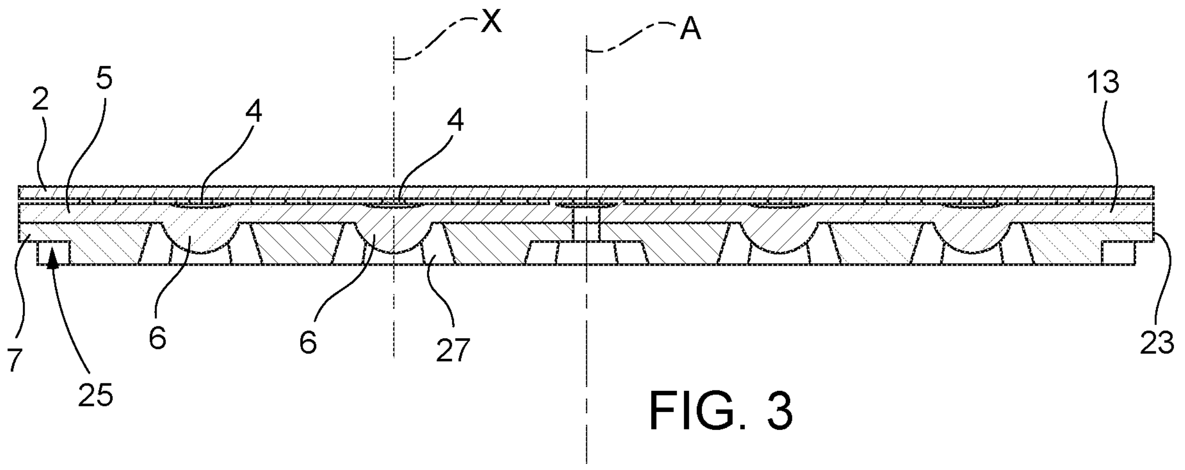
FIG. 3 is a view in longitudinal section of the lighting device in FIG. 1.
Figure 4:
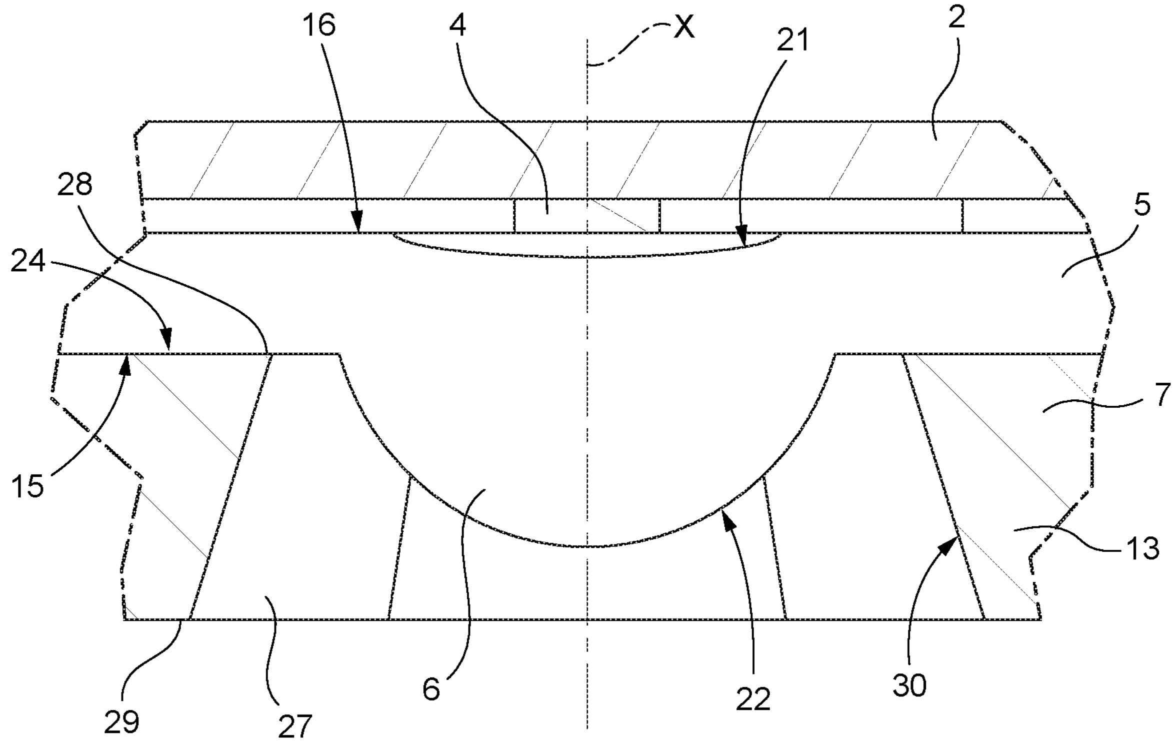
FIG. 4 is a view in enlarged scale of a detail of the lighting device in FIG. 3.

With reference to FIGS. 3 and 4 as well, the lenses 6 are arranged on the body of the optical element 5 so as to be aligned with respective LEDs 4 and extend along respective optical axes X parallel to each other and to the axis A.

The lenses 6 have a cross-section, perpendicular to the respective optical axis X and to the axis A, that is circular and are defined by bodies of revolution around the respective optical axis X.

In the preferred embodiment illustrated, the lenses 6 are shaped according to what is described in the patent application EP4057364A1.

In particular, each lens 6 has a concave inlet surface 21, facing a respective LED, and a convex outlet surface 22, basically aligned with each other along the optical axis X.

The inlet surface 21 and the outlet surface 22 have respective elliptic profiles and the outlet surface 22 has an elliptic profile with an eccentricity greater than 0 and lower than the eccentricity of the elliptic profile of the inlet surface 21.

The inlet surface 21 defines a cavity on the rear face 16 of the optical element 5, in which the respective LED 4 is optionally housed, at least partially; and it has a concave profile so that the totality of the light flow emitted by the LED 4 hits the inlet surface 21 and is refracted inside the lens 6.

The outlet surface 22 axially projects from the front face 15 of the optical element 5 towards the grid 7.

The grid 7 is positioned in front of the front face 15 of the optical element 5.

The body 13 of the grid 7 is a disc-shaped body delimited by a circular radially outer peripheral edge 23 and having a rear face 24 facing and optionally in contact with the front face 15 of the optical element 5, and a front face 25, opposite the rear face 24.

Advantageously, the body 13 of the grid 7 is a monolithic body, for example made of polymer.

The grid 7 has multiple hexagonal cells 27 organised in a honeycomb pattern and aligned and facing respective lenses 6 of the optical element 5.

Figure 5:
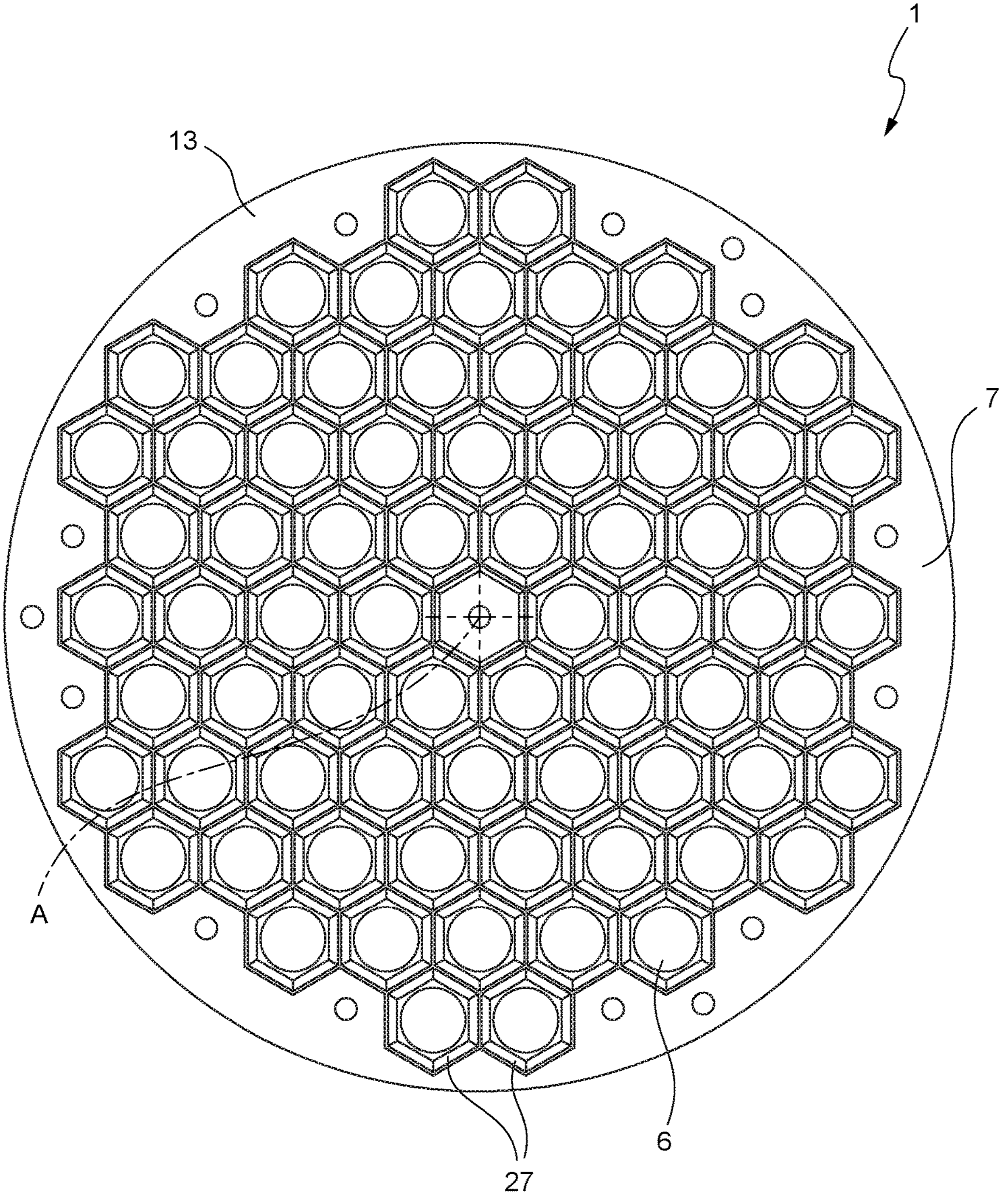
FIG. 5 is a front plan view of the lighting device in FIG. 1.

With reference to FIG. 5 too, the cells 27 have a regular hexagonal shape and are organised in rows of parallel cells, and adjacent rows are offset from each other to define a honeycomb pattern of hexagonal cells.

The cells 27 are formed passing through the body 13 and extend along respective axes parallel to each other and to the axis A and coinciding with respective optical axes X of the lenses.

Each cell 27 extends between a proximal edge 28, facing the optical element 5 and the respective LED 4, and a distal edge 29, opposite the respective LED 4, and is delimited by an inner lateral surface 30.

The cells 27 have a hexagonal cross-section; in the embodiment illustrated, both the proximal edge 28 and the distal edge 29 have a regular hexagonal shape.

In the example illustrated, but not necessarily, the proximal edge 28 is flush with the rear face 24 of the body 13, while the distal edge 29 projects from the front face 25.

In the embodiment illustrated, the cells 27 are hollow and empty inside.

The inner lateral surface 30 is preferably tapered and diverging from the proximal edge 28 to the distal edge 29.

Together, the cells 27 form a honeycomb pattern in plan view that is basically hexagonal; in other words, the overall shape of the pattern of the cells 27 is, in turn, basically hexagonal.

A lens 6 and an LED 4 correspond to each cell 27, i.e. each LED 4 is aligned with a respective lens 6 and a cell 27 of the grid 7; the LEDs 4 are, thus, also arranged, as indicated above, in a honeycomb pattern.

It is understood that some cells 27 may not be associated with an LED 4 and/or a lens 6; in other words, one or more LEDs 4 may be missing in the honeycomb pattern and the respective lenses 6. For example, the central cell 27 of the grid 7 may be designed for a fastener or have another function and, therefore, a central LED on the LED holder plate 2 and the respective lens 6 on the optical element 5 may be missing.

In use, the light beams emitted by the LEDs 4 are all intercepted by the respective inlet surfaces 21 of the lenses 6. The inlet surfaces 21 are shaped and positioned so as to receive the entirety of the light beams emitted by the respective LEDs 4.

The light beams are refracted by the inlet surface 21 and cross the lens 6, reaching the outlet surface 22 where they are refracted again towards the outside of the lens 6.

The lens 6 and, in particular, the inlet surface 21 and the outlet surface 22 are shaped so that the light beams refracted by the inlet surface 21 reach the outlet surface 22 without additional refraction or reflections inside the lens 6.

The lens 6 is shaped so that the outlet angles of the light beams from the outlet surface 22 are such that the light beams do not hit the inner lateral surface 30 of the respective cell 27 of the grid 7.

Figure 6:
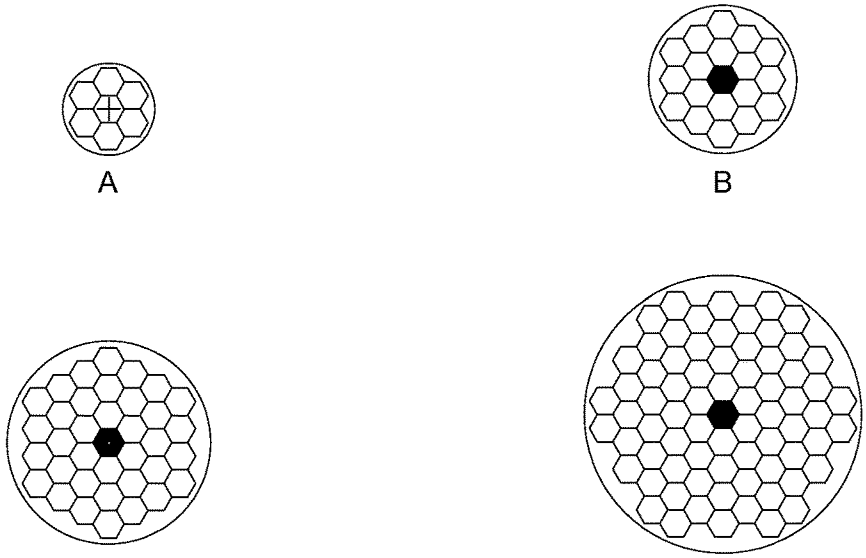
FIG. 6 schematically shows alternative embodiments of the lighting device of the invention.

FIG. 6 illustrates, by way of example, some embodiments that are suitable for producing lighting devices 1 of different sizes.

Figure 7:
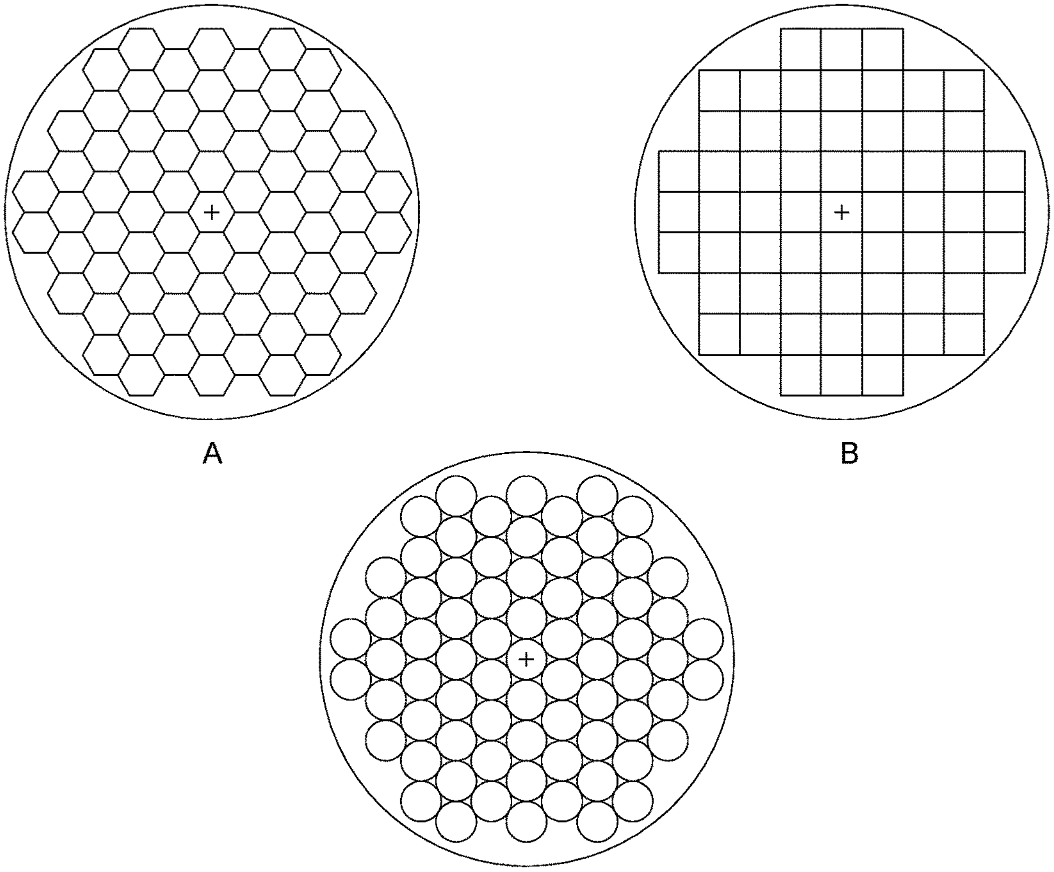
FIG. 7 schematically shows an embodiment of the invention compared with alternatives that do not fit within the scope of the invention.

For example, the lighting devices illustrated in FIG. 6 have:

diameter 50 mm; grid with 7 cells (FIG. 6A);
diameter 80 mm; grid with 19 cells (FIG. 6B);
diameter 110 mm; grid with 37 cells (FIG. 6C);
diameter 150 mm; grid with 73 cells (FIG. 6D);

FIG. 7 illustrates how the honeycomb pattern grid 7 makes it possible to efficiently occupy the available area of the lighting device 1, maximising both the number of light points and the surface functional to optical performance, in relation to other grid patterns with cells with another shape and with the same overall dimensions (for example, with a diameter of 150 mm).

In the example according to the invention (FIG. 7A), in a disc with a diameter of 150 mm, the grid contains 73 cells with a percentage of area unavailable for optical performance equal to 22%; with a pattern of square cells with comparable dimensions (FIG. 7B), you could use 61 cells with a percentage of area not functional to optical performance of 24%; with a pattern of round cells with comparable dimensions (FIG. 7C), you could use 73 cells with a percentage of area not functional to optical performance of 30%.

Finally, it is understood that the LED lighting device described and illustrated here, may be modified, and variants thereof produced, without departing from the scope of the attached claims.

The invention claimed is:

1. An LED lighting device, extending along a longitudinal axis and having a circular shape about the axis comprising:
- an LED holder plate, having a front face which supports a plurality of LEDs;
- an optical element positioned in front of the front face of the LED holder plate and having a plurality of lenses aligned with and facing respective LEDs; and
- a grid positioned in front of the optical element on an opposite side of the LED holder plate, the grid having a plurality of hexagonal cells arranged in a honeycomb pattern and aligned with and facing respective lenses of the optical element,
- wherein each lens has a concave inlet surface, facing a respective LED, and a convex outlet surface, substantially aligned to each other, and
- wherein the inlet surface and the outlet surface have respective elliptic profiles such that the outlet surface has an elliptic profile with an eccentricity greater than 0 and lower than an eccentricity of an elliptic profile of the inlet surface.

2. The LED lighting device according to claim 1, wherein the grid comprises a disc-shaped body delimited by a circular radially outer peripheral edge, and the cells are formed through the body.

3. The LED lighting device according to claim 1, wherein the cells are arranged to form a honeycomb pattern which is substantially hexagonal in plan view.

4. The LED lighting device according to claim 1, wherein the cells are internally empty hollow cells.

5. The LED lighting device according to claim 1, wherein each cell extends from a proximal edge, facing toward the respective LED and a distal edge, opposite to the respective LED, and is delimited by an inner lateral surface tapered and divergent from the proximal edge toward the distal edge.

6. The LED lighting device according to claim 1, wherein the LED holder plate, the optical element and the grid-comprise respective circular disc-shaped bodies aligned to one another along the axis.

7. The LED lighting device according to claim 1, wherein the optical element comprises a monolithic body made of a transparent material and the lenses are defined by respective portions of said body of the optical element.

8. The LED lighting device according to claim 1, wherein the lenses have a circular cross section perpendicular to the axis.

9. An LED lighting device, extending along a longitudinal axis and having a circular shape about the axis, comprising:
- an LED holder plate, having a front face which supports a plurality of LEDs;
- an optical element positioned in front of the front face of the LED holder plate and having a plurality of lenses aligned with and facing respective LEDs; and
- a grid positioned in front of the optical element on an opposite side of the LED holder plate, the grid having a plurality of hexagonal cells arranged in a honeycomb pattern and aligned with and facing respective lenses of the optical element,
- wherein each lens has a concave inlet surface, facing a respective LED, and a convex outlet surface, substantially aligned to each other,
- wherein the inlet surface and the outlet surface have respective elliptic profiles and the outlet surface has an elliptic profile with an eccentricity greater than 0 and lower than an eccentricity of an elliptic profile of the inlet surface, and
- wherein the grid has a body which is a disc-shaped body delimited by a circular radially outer peripheral edge, and the hexagonal cells are proximate to but spaced apart from the radially outer peripheral edge so that all the hexagonal cells have a regular hexagonal shape in plan view, being not truncated by the radially outer peripheral edge, and the hexagonal cells form a honeycomb pattern having an overall shape which is, in turn, substantially hexagonal in the plan view and fully inscribed in a hexagon.

10. The LED lighting device according to claim 9, wherein the cells are internally empty hollow cells.

11. The LED lighting device according to claim 9, wherein each cell extends from a proximal edge, facing toward the respective LED, and a distal edge, opposite to the respective LED, and is delimited by an inner lateral surface tapered and divergent from the proximal edge toward the distal edge.

12. The LED lighting device according to claim 9, wherein the LED holder plate, the optical element and the grid comprise respective circular disc-shaped bodies aligned to one another along the axis.

13. The LED lighting device according to claim 9, wherein the optical element comprises a monolithic body made of a transparent material and the lenses are defined by respective portions of said body of the optical element.

14. The LED lighting device according to claim 9, wherein the lenses have a circular cross section perpendicular to the axis.

* * * * *